(12) United States Patent
Zimmer et al.

(10) Patent No.: US 6,715,933 B1
(45) Date of Patent: Apr. 6, 2004

(54) OPTICAL-FIBER CONNECTOR AND METHOD OF CONNECTION TO THE END OF AN OPTICAL-FIBER-CABLE

(75) Inventors: Rainer Zimmer, Schalksmuhlen (DE); Bernd Lipka, Hagen (DE); Helmar Krupp, Gerelsberg (DE)

(73) Assignee: CCS Technology, Inc., Wilmington, DE (US)

( * ) Notice: Subject to any disclaimer, the term of this patent is extended or adjusted under 35 U.S.C. 154(b) by 9 days.

(21) Appl. No.: 10/031,666

(22) PCT Filed: Jul. 18, 2000

(86) PCT No.: PCT/DE00/02324

§ 371 (c)(1),
(2), (4) Date: Jun. 11, 2002

(87) PCT Pub. No.: WO01/06291

PCT Pub. Date: Jan. 25, 2001

(30) Foreign Application Priority Data

Jul. 19, 1999 (DE) .......................................... 199 33 740

(51) Int. Cl.⁷ .............................. G02B 6/38; G02B 6/36
(52) U.S. Cl. ............... 385/86; 385/77; 385/70
(58) Field of Search .............................. 385/86, 77, 70, 385/60

(56) References Cited

U.S. PATENT DOCUMENTS

| | | | | |
|---|---|---|---|---|
| 5,222,169 A | * | 6/1993 | Chang et al. ................. | 385/87 |
| 5,363,459 A | * | 11/1994 | Hultermans .................. | 385/60 |
| 6,019,521 A | * | 2/2000 | Manning et al. .............. | 385/77 |
| 6,238,104 B1 | * | 5/2001 | Yamakawa et al. ........... | 385/87 |

* cited by examiner

Primary Examiner—Chandrika Prasad

(57) ABSTRACT

The invention relates to an optical-fiber connector that consists of a ferrule (2) with a factory-fixed optical fiber cable element (2a) that can be detachably fixed in a ferrule support (9). The optical-fiber cable element (2a) is thermally spliced to the end (6) of the optical fiber cable (14) to be connected before the ferrule (2) is fixed in the seat (18) of the ferrule support (9).

4 Claims, 4 Drawing Sheets

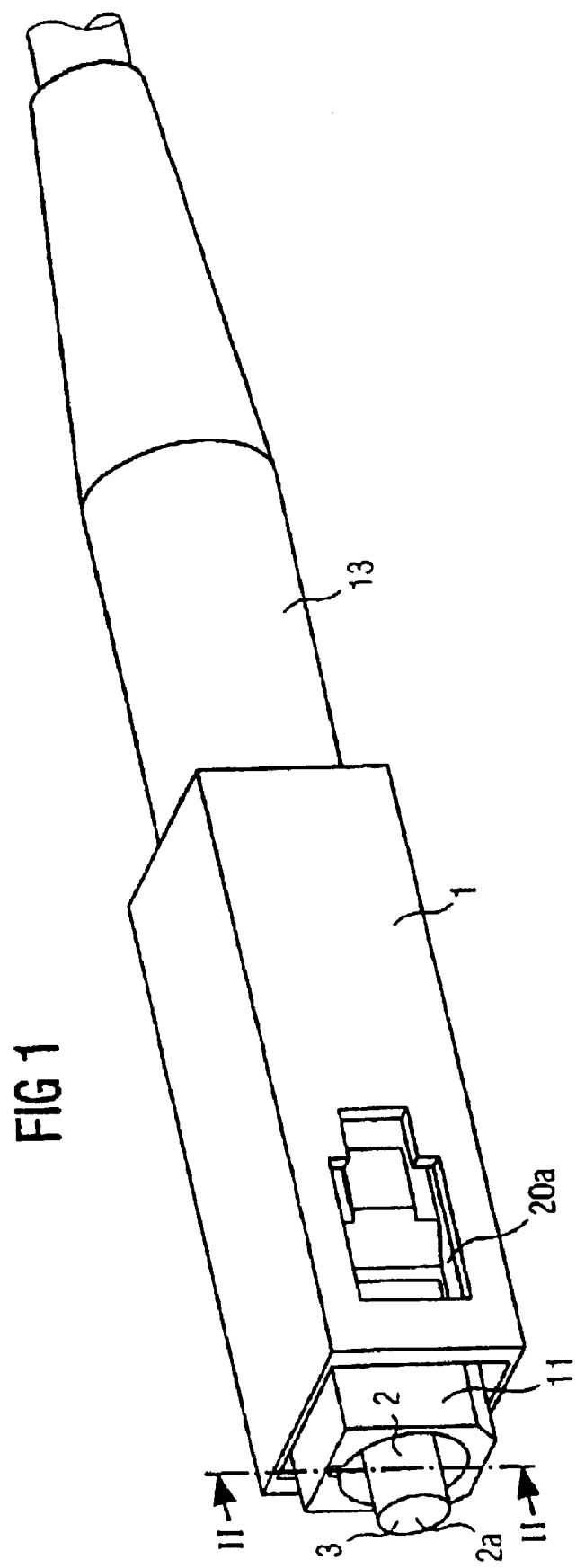

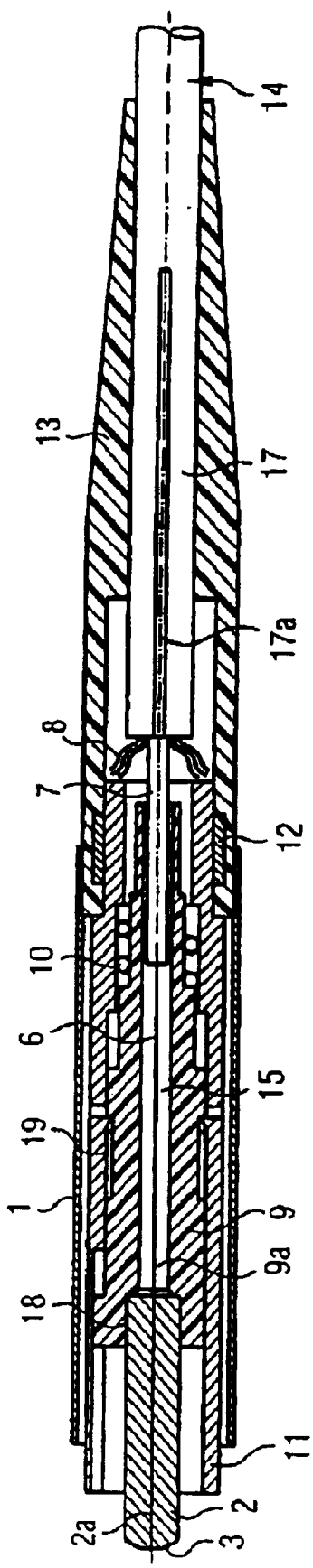

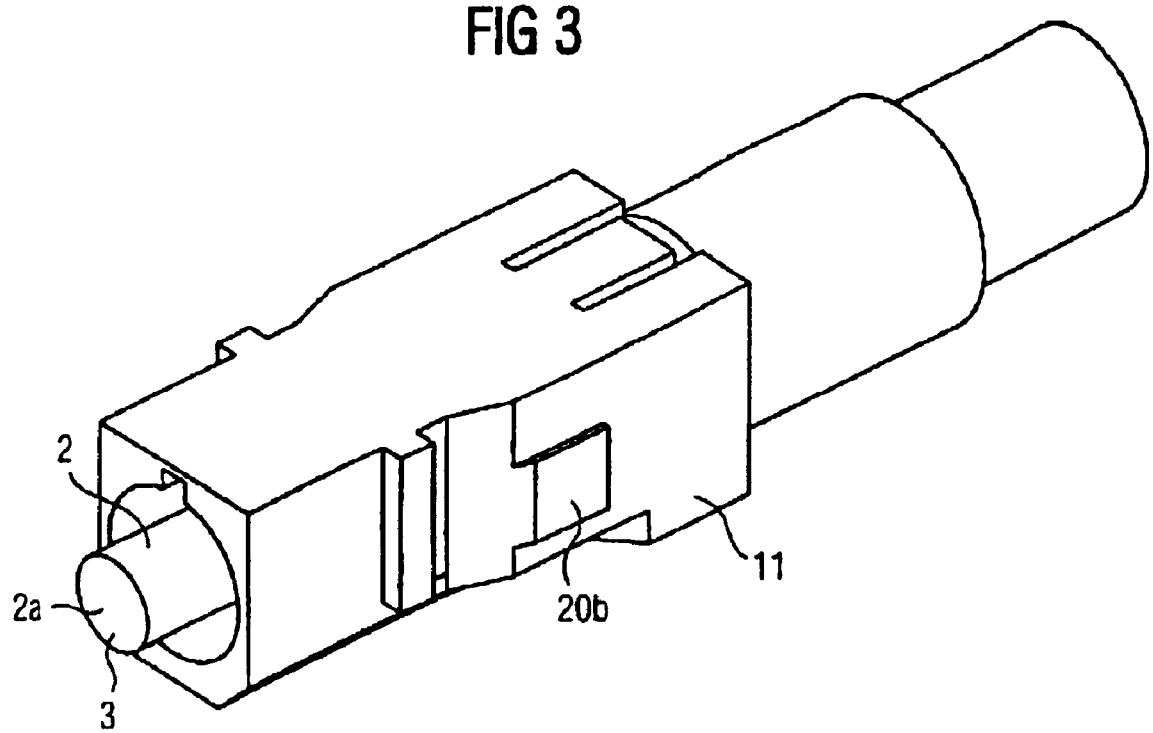

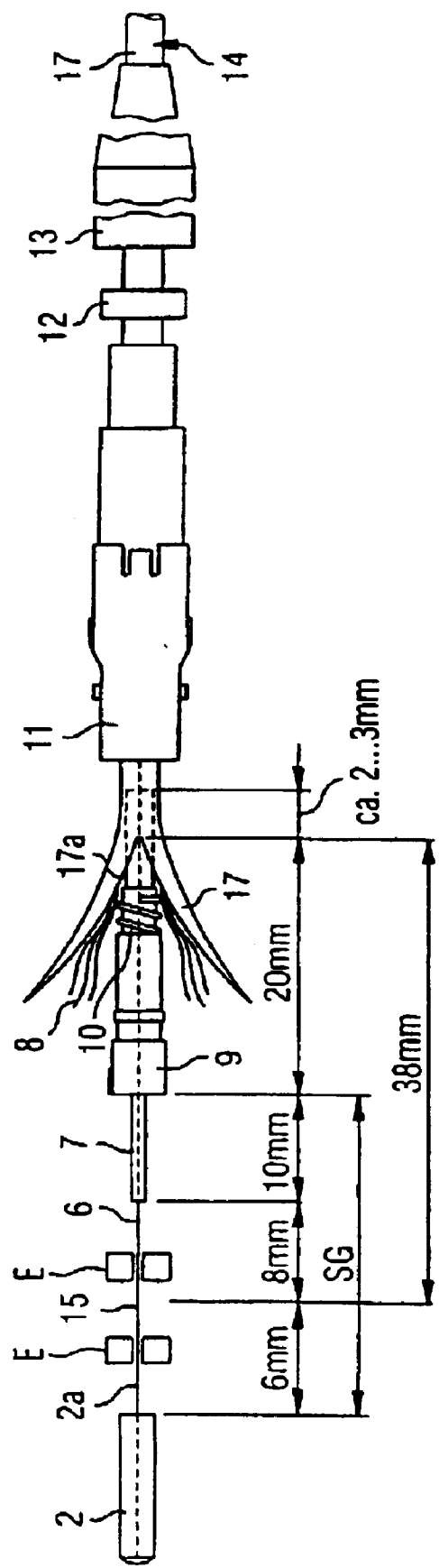

OPTICAL-FIBER CONNECTOR AND METHOD OF CONNECTION TO THE END OF AN OPTICAL-FIBER-CABLE

The invention relates to an optical fiber connector having an optical fiber piece fixed in the factory in a ferrule, the end of the optical fiber directed outward being provided with a polished surface, and the end directed inward projecting from the ferrule and being connected by thermal welding to the inserted end of an optical fiber to be connected, the ferrule further being fixed in a ferrule holder.

Furthermore, the invention relates to a method for connecting this optical fiber connector to the end of an optical fiber cable.

BACKGROUND OF THE INVENTION

Two groups of connectors, factory-fitted and field-mounting connectors, are known per se. Very good mechanical and optical properties can be achieved with factory-fitted connectors. It is thereby possible to assemble all types of fibers onto the corresponding connectors. The end faces of the connectors can be provided according to the requirements with all known sections such as, for example, 0° PC, APC or UPC. However, it is disadvantageous in this case that this type of connector must be provided with a piece of glass fiber (pigtail) whose length is mostly between 2.5 and 3 meters. The end of this glass fiber piece is then spliced onto the cable to be connected. However, this produces an additional connection, or splice point, which brings with it an additional loss in the transmission link. This connecting point must then additionally be surrounded by an appropriate mechanical guard.

In the case of "field-mounting connectors", it is advantageous that the cable to be connected can be connected directly to the connector. This eliminates the additional splice, and also the additional mechanical guard. A plurality of systems of field-mounting connectors are known. In the case of a bonded connector, the optical fiber is bonded in an appropriate receptacle and the end face is subsequently ground and polished. However, with some types of section this grinding and polishing operation is very difficult, or even cannot be executed at all. In the case of what are termed spliced connectors, a synthesis of factory-fitted and field-mounting connectors is undertaken. With these connectors, the difficult part of bonding in the optical fibers, and the grinding of the end face are already carried out in the factory, and the connection, or splicing on of the optical fiber to be connected is then executed on site during the actual field assembly. In principle, this type of connector corresponds to a factory-fitted connector, but no additional outlay is required here to protect the splice point, because the splice is located directly in the connector. Such a type of connector is known by the name of "FuseLite connector". In the case of such a "FuseLite connector", use is made of a factory-fitted ferrule with a bonded optical fiber that is ground at the end face and in the case of which an optical fiber piece projects toward the second end face. The optical fiber to be connected is mounted directly onto this optical fiber piece by thermal splicing inside the connector housing. This means that in this region the connector must have appropriate cutouts through which the arc must be guided for welding. This means that in this region the connector must consist of a material of high quality that is exceptionally heat resistant. This material is not permitted to warp at the existing high temperatures, since otherwise it is impossible to achieve the required splice quality. A high quality ceramic, for example zirconium, is used as material for this purpose.

German laid-open application DE 19517750 discloses an optical fiber connector in the case of which the end of an already permanently fixed piece of optical fiber is connected by thermal welding in a connecting sleeve to the end of an optical conductor to be connected. Recessed into the connecting sleeve for this purpose are lateral openings through which the welding electrodes are led up to the splice point.

SUMMARY OF THE INVENTION

It is the object of the present invention to create a field mounting optical fiber connector in the case of which the above-named difficulties relating to splicing are simplified, and in the case of which it is also possible to make use in the splice region of materials not of such high quality. The object set is achieved with the aid of an optical fiber connector of the type explained at the beginning, by virtue of the fact that the ferrule with the fixed optical fiber can be detached from the ferrule holder before the thermal welding of the optical fiber end, in that the ferrule is pressed into a receptacle of the ferrule holder after the thermal welding, in that a basic housing with an axially operating compression spring is arranged over the ferrule holder, in that a crimping ring for fixing the stress member of the optical fiber is pressed on the basic housing, in that an anti-kink guard is applied over the cladding of the optical fiber to be connected, and over the end of the basic housing, and in that an outer housing with latching elements is drawn on as a cover.

Furthermore, the object arises with the invention of developing a method for connecting the connector according to the invention to the end of an optical fiber. This object set is achieved with the aid of the method according to the features of claim 5.

Owing to the design of the optical fiber connector according to the invention, it is to be emphasized as a particular advantage by comparison with the prior art that splicing the optical fiber piece held in a ferrule onto the end of the optical fiber to be connected can not be executed inside a connector housing, but separately outside thereof In addition, it is now possible also to make use of a normal optical splicer for the thermal welding of the optical fiber ends. This means that a specially modified splicer that must be tuned to the geometry of the connector housing need not be used, as previously customary, for the splicing. Moreover, the welding takes place outside the ferrule, and so the material of the ferrule is no longer exposed to the high temperatures during the thermal welding operation. After the welding operation, the optical fiber connector is then assembled, the ferrule firstly being pressed into a receptacle in a ferrule holder and thereby fixed exactly in position. Subsequently, the further individual parts of the optical fiber connector, which have previously already been pushed in the appropriate sequence onto the optical fiber to be connected, are positioned over the ferrule and the ferrule holder. This completely eliminates the expensive splicing by welding inside the optical fiber connector, and/or a ferrule specially modified therefor and a splicer also specifically created therefor. The splicing is therefore a routine mounting operation such as is otherwise also carried out in the case of any thermal optical fiber splicing between two optical fiber ends. The design of the optical fiber connector described therefor also simultaneously characterizes the method according to the invention, in accordance with which the optical fiber connector is assembled after the finished thermal welding of the optical fiber ends. It is particularly advantageous in the case of the method that the splicing is performed before the assembly of the optical fiber connector, using the distances and dimensions prescribed by the individual parts. Consequently, all the positions of the individual parts are already prescribed for the assembly at this first operation.

BRIEF DESCRIPTION OF THE DRAWINGS

The invention will now be explained in more detail with the aid of four figures, in which:

FIG. 1 shows the finally mounted optical fiber connector,

FIG. 2 shows the optical fiber connector according to FIG. 1, in a longitudinal section, FIG. 3 shows the basic housing of the optical fiber connector with inserted ferrule, and FIG. 4 illustrates the cycle of the method according to the invention for producing the thermal welding of the optical fiber ends, and for mounting the optical fiber connector.

DESCRIPTION OF THE INVENTION

The optical fiber connector in accordance with the invention is illustrated in the assembled state in FIG. 1. It therefore shows the ferrule 2, which is inserted into a basic housing 1, and in which the optical fiber piece 2a required for splicing is centrally arranged. The end faces 3 of the ferrule 2 and of the optical fiber piece 2a have already been provided at the factory with a suitable section such as, for example, with one of the types of section 0° PC, APC, UPC, which are known per se, such that complicated and difficult work no longer be executed when actually mounting the connector. An outer housing 1, which is provided with the corresponding latching elements 20a for fixing the optical fiber connector, is mounted over the basic housing 11. The anti-kink guard 13 projects at the opposite end of the optical fiber connector. Also indicated is a section II-II, which is explained in FIG. 2.

FIG. 2 shows the entire inner design of the optical fiber connector according to the invention, the optical fiber connector already being finished at the splice point 15. It follows therefrom that the ferrule 2 with the optical fiber piece 2a already inserted at the factory, and with the end face 3, likewise provided with the desired section in the factory, is pressed after splicing has been performed in a receptacle 18 of the ferrule holder 9 after splicing has been perform and thereby fixed. Located inside a bore 9a in the ferrule holder 9 are the ends, connected to one another at the splice point 15, of the optical fiber piece 2a and of the optical fiber 6 to be connected, which is freed from its coating 7 in the welding point region. The stress members 8, for example Kevlar fibers, of the optical fiber cable 14 are fixed at the end of the basic housing 11 with the aid of a crimping ring 12. The basic housing 11 is secured in its position with the ferrule 9 by resilient latching elements 19. A pressure spring 10, which ensures the required contact pressure with the connector inserted, is drawn on a rear step of the basic housing 11. Also illustrated is the anti-kink guard 13, which prevents impermissible kinking of the inserted optical fiber cable 14. It may also be seen that the cladding 17 has been provided during mounting with longitudinal slots 17a.

Illustrated in FIG. 3 is the basic housing 11 with a latching element 20b which serves for latching into the outer housing, which surrounds it later. Also illustrated is the inserted ferrule 2 with the optical fiber piece 2a and the ground end face 3.

It follows from FIG. 4 how the individual parts of the optical fiber connector are combined for mounting before the splicing operation, and so the method according to the invention can also be derived from this illustration. Thus, the cladding 17 of the optical fiber cable 14 is provided on a length of approximately 20 mm with longitudinal slots 17a such that the stress members 8 of the optical fiber cable 14 can be gripped. Moreover, the optical fiber cable 14 is freed from its coating in the region of the welding point 15 over a length of approximately 8 mm. The anti-kink guard 13, the crimping ring 12 and the basic housing 11 are now pushed in sequence over the cladding 17 of the optical fiber cable 14. The ferrule holder 9 with the pressure spring 10 mounted at the rear is pushed on under the cladding 17 opened by longitudinal slots 17a, the optical fiber still projecting with its coating 7 over a length of approximately 10 mm. The optical fiber cable 14 to be connected is thereby prepared for splicing over a total length of approximately 38 mm with the end of the optical fiber piece 2a projecting in the ferrule 2. The end, prepared with the individual parts, of the optical fiber cable 14 is now laid into a completely normal thermal optical fiber splicer SG, known per se and illustrated here only symbolically, and fixed in its position with clamps E. From the other side of the optical fiber splicer SG, the optical conductor piece 2a already fixed in the ferrule 2 in the factory is pushed in the opposite direction up to the splice point 15 and likewise fixed with clamps E, the length of the projecting optical fiber piece 2a being approximately 6 mm. The dimensions in this figure are to be regarded only as examples and are, of course, to be adapted as appropriate in each case to the optical fiber connector used. After the thermal splicing has been carried out in the way known per se, the ferrule holder 9 is pushed against the ferrule 2, the latter being pressed into and fixed in a receptacle 18 (see FIG. 2). The splice point 15, and also the exposed optical fiber ends are thereby accommodated in a protected fashion in the bore of the ferrule holder 9. This design and mounting operation according to the invention renders it possible to make use of a commercially available optical fiber splicer. Subsequently, the remaining individual parts previously pushed on are then arranged over the ferrule holder 9, the stress members 8 of the optical fiber cable 14 additionally being clamped and fixed on the ferrule holder by the crimping ring 12. It is also expedient for the ferrule holder 9 also to be pushed in further a little by approximately 2 to 3 mm below the unslotted cable cladding 17.

These measures according to the invention have rendered it possible for the welding point certainly to be situated inside the optical fiber connector when the optical fiber to be connected is spliced on, without the need to provide special bores or cutouts for the welding operation in the ferrule. This simplifies the ferrule very greatly, since, firstly, there is no need to use high-temperature resistant material and, secondly, a simple sleeve shape is completely sufficient. It is advantageous, in addition, that this method also requires no modification or reconfiguration of optical fiber splicers.

What is claimed is:

1. An optical fiber connector attachable to a fiber optic cable, the optical fiber connector having a factory polished end face and comprising:

a ferrule having a piece of an optical fiber previously secured therein, the piece of optical fiber extending from the ferrule in a reaward direction for fusion splicing to the fiber optic cable;

a ferrule holder removably attached to the ferrule to allow the piece of optical fiber extending from the ferrule to be exposed and fusion spliced to the fiber optic cable;

a basic housing to fit over the ferrule and ferrule holder;

a crimping ring for fixing a stress member of the fiber optic cable to the basic housing;

an anti-kink guard that slides over the fiber optic cable and attaches to an end of the basic housing; and an outer housing.

2. The optical fiber connector of claim 1, wherein the piece of the optical fiber extending from the ferrule has an end point that is disposed within the ferrule holder when the ferrule holder is attached to the ferrule.

3. A method of connecting an optical fiber connector to a fiber optic cable comprising the steps of:

providing a ferrule having a piece of an optical fiber previously secured therein, the piece of optical fiber extending from the ferrule in a rearward direction;

sliding a ferrule holder over a portion of the fiber optic cable, the ferrule bolder being removably attachable to the ferrule;

fusion splicing the piece of optical fiber extending outward from the rearward portion of the ferrule to an optical fiber in the fiber optic cable; and inserting the ferrule into the ferrule holder, the ferrule holder housing a portion of the piece of optical fiber and a portion of the optical fiber in the fiber optic cable after the piece of optical fiber and the optical fiber are fused together.

4. The method of claim 3, further comprising the steps of:

inserting the ferrule and ferrule holder into a basic housing;

crimping a crimp ring to the basic housing to secure at least one stress member from the fiber optic cable to the basic housing;

securing an anti-kink guard to a rearward end of the basic housing; and sliding an outer housing over at least a portion of the basic housing.

\* \* \* \* \*

UNITED STATES PATENT AND TRADEMARK OFFICE
CERTIFICATE OF CORRECTION

PATENT NO. : 6,715,933 B1 Page 1 of 1
DATED : April 6, 2004
INVENTOR(S) : Rainer Zimmer, Bernd Lipka and Helmar Krupp It is certified that error appears in the above-identified patent and that said Letters Patent is hereby corrected as shown below:

Column 4,
Line 59, delete "reaward", and add -- rearward --.

Column 5,
Line 14, delete "bolder", and add -- holder --.

Signed and Sealed this

Twelfth Day of April, 2005

JON W. DUDAS
*Director of the United States Patent and Trademark Office*